(12) United States Patent
Magalhaes et al.

(10) Patent No.: US 8,419,039 B1
(45) Date of Patent: Apr. 16, 2013

(54) ADJUSTABLE TRAILER TONGUE

(76) Inventors: Osni Magalhaes, Fort Pierce, FL (US);
Ronald Diniz, Fort Pierce, FL (US);
Ricardo M. L. Amaral, Kissimmee, FL (US); Todd Kidd, Amarillo, TX (US);
Robson Diniz, Fort Pierce, FL (US)

( * ) Notice: Subject to any disclaimer, the term of this patent is extended or adjusted under 35 U.S.C. 154(b) by 0 days.

(21) Appl. No.: 13/470,210

(22) Filed: May 11, 2012

Related U.S. Application Data

(60) Provisional application No. 61/484,938, filed on May 11, 2011.

(51) Int. Cl.
*B60D 1/46* (2006.01)
(52) U.S. Cl.
USPC .................................. 280/490.1; 280/478.1
(58) Field of Classification Search ............... 280/490.1, 280/495, 478.1, 491.1, 491.5, 477, 494, 488, 280/462, 511
See application file for complete search history.

(56) References Cited

U.S. PATENT DOCUMENTS

| | | | |
|---|---|---|---|
| 2,327,308 A | 2/1943 | Johnston | |
| 3,035,856 A * | 5/1962 | Mleczko et al. ........... | 280/490.1 |
| 3,235,284 A * | 2/1966 | Yant ........................... | 280/405.1 |
| 3,830,522 A | 8/1974 | Boucher | |
| 4,103,926 A * | 8/1978 | Johnston et al. .......... | 280/414.1 |
| 4,429,895 A | 2/1984 | Hunter | |
| 5,226,657 A * | 7/1993 | Dolphin .................... | 280/478.1 |
| 5,249,911 A * | 10/1993 | Marola ........................ | 414/563 |
| 5,354,087 A * | 10/1994 | Head .......................... | 280/490.1 |
| 6,003,892 A | 12/1999 | Henson | |
| 6,042,137 A * | 3/2000 | McIntosh .................. | 280/490.1 |
| 6,663,133 B1 | 12/2003 | Rosenlund | |
| 6,726,237 B1 * | 4/2004 | Carrico ..................... | 280/490.1 |
| RE38,751 E * | 7/2005 | Davis ........................ | 280/491.4 |
| D508,221 S * | 8/2005 | Rebick ........................ | D12/162 |
| 6,923,475 B1 * | 8/2005 | Martin et al. ................ | 280/789 |
| 7,219,915 B2 * | 5/2007 | Christensen .............. | 280/490.1 |
| 7,255,362 B2 * | 8/2007 | Smith ........................ | 280/490.1 |
| D569,770 S * | 5/2008 | Biery, Jr. ..................... | D12/162 |
| 7,559,570 B2 | 7/2009 | Cearns | |
| 8,172,248 B2 * | 5/2012 | Groves ....................... | 280/414.5 |
| 2003/0184048 A1 * | 10/2003 | Bonde ........................ | 280/491.5 |
| 2003/0222426 A1 * | 12/2003 | Rosenlund ................ | 280/490.1 |
| 2004/0032112 A1 * | 2/2004 | Reese et al. ................. | 280/477 |
| 2004/0135346 A1 * | 7/2004 | Moss ......................... | 280/491.1 |
| 2005/0173892 A1 | 8/2005 | Terminello | |
| 2006/0045693 A1 | 3/2006 | Eliott et al. | |
| 2011/0038699 A1 | 2/2011 | Nguyen | |

* cited by examiner

*Primary Examiner* — Tashiana Adams
(74) *Attorney, Agent, or Firm* — Allen, Dyer, Doppelt Milbrath & Gilchrist, P.A.

(57) ABSTRACT

A trailer tongue assembly includes a trailer tongue having trader tongue front and rear portions, the trailer tongue front portion being configured for releasable attachment to a trader hitch, and an attachment frame connected to the trailer tongue rear portion and configured for attachment to a trailer. The trailer tongue front portion is independently translatable and rotatable in a vertical plane relative to the attachment frame.

17 Claims, 5 Drawing Sheets

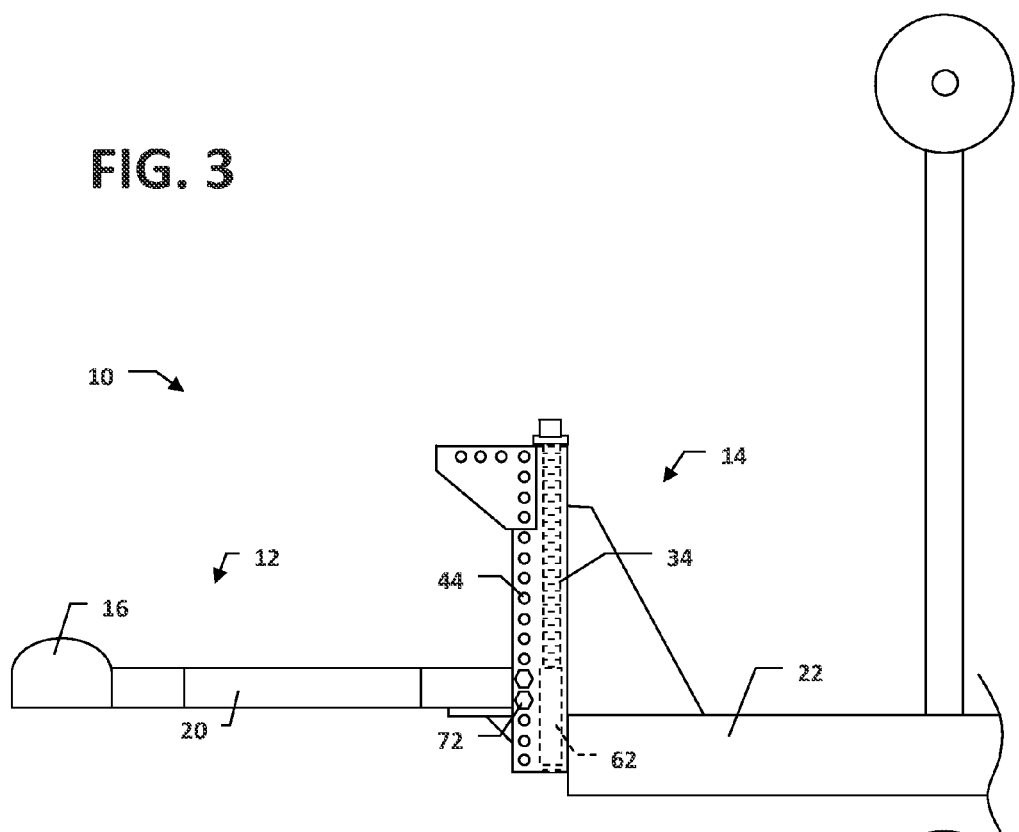
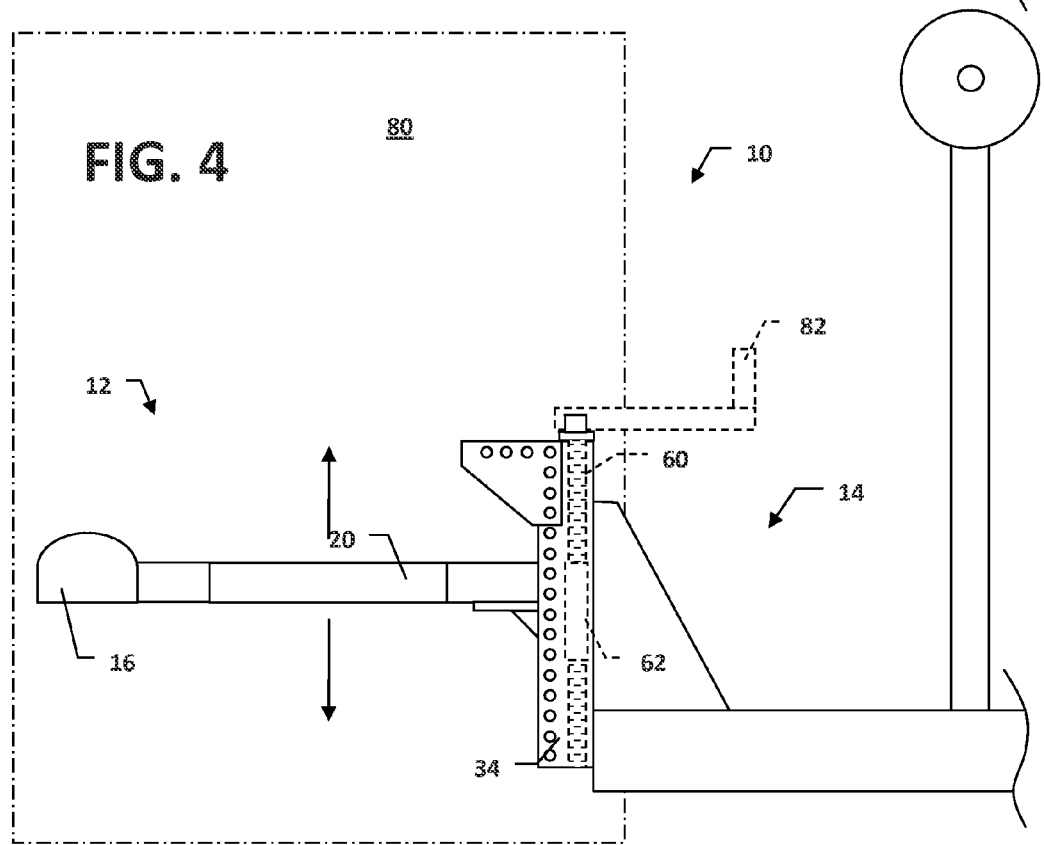

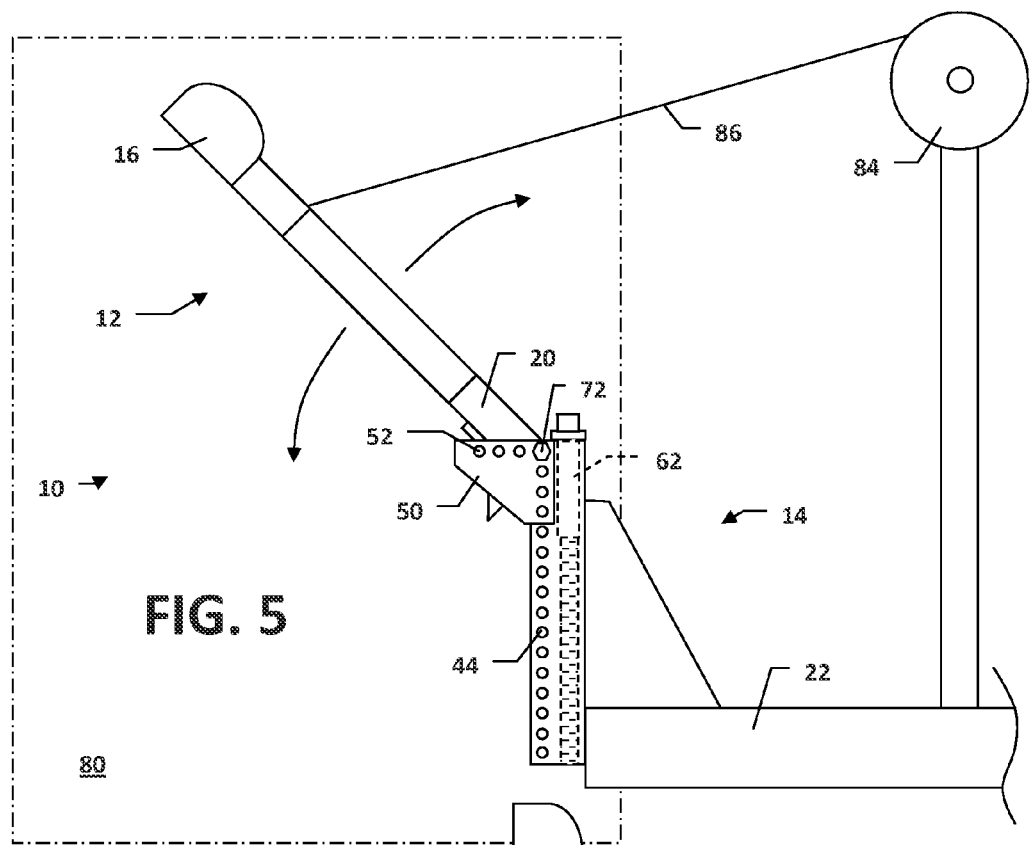
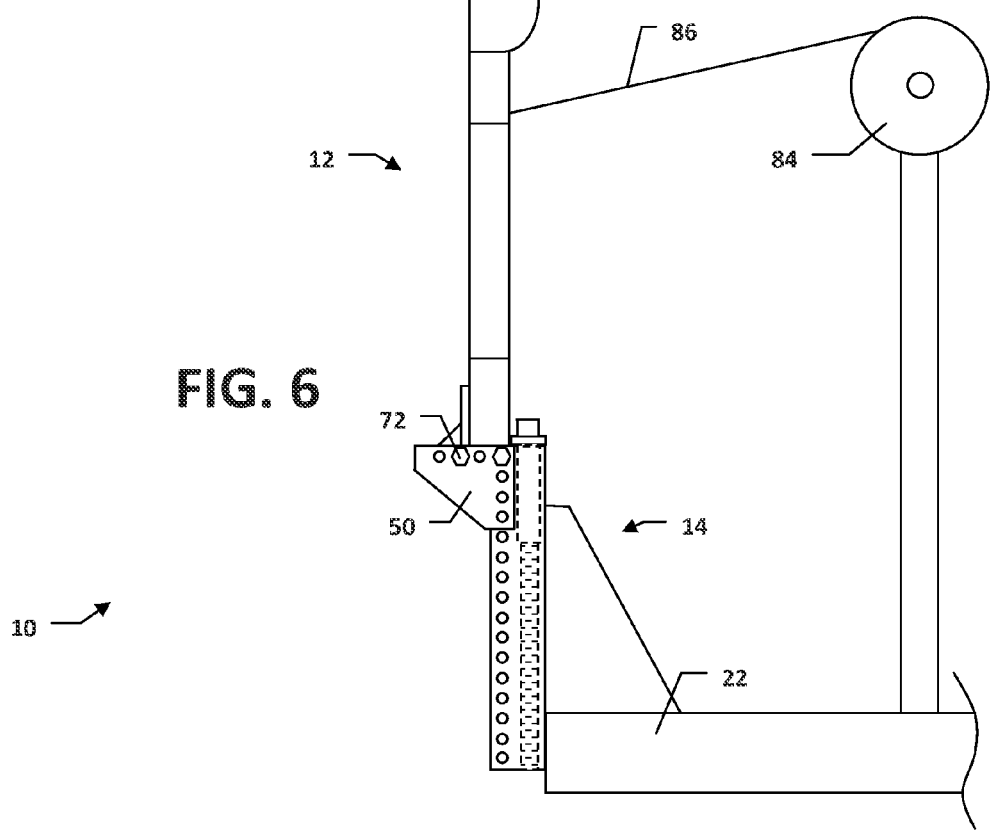

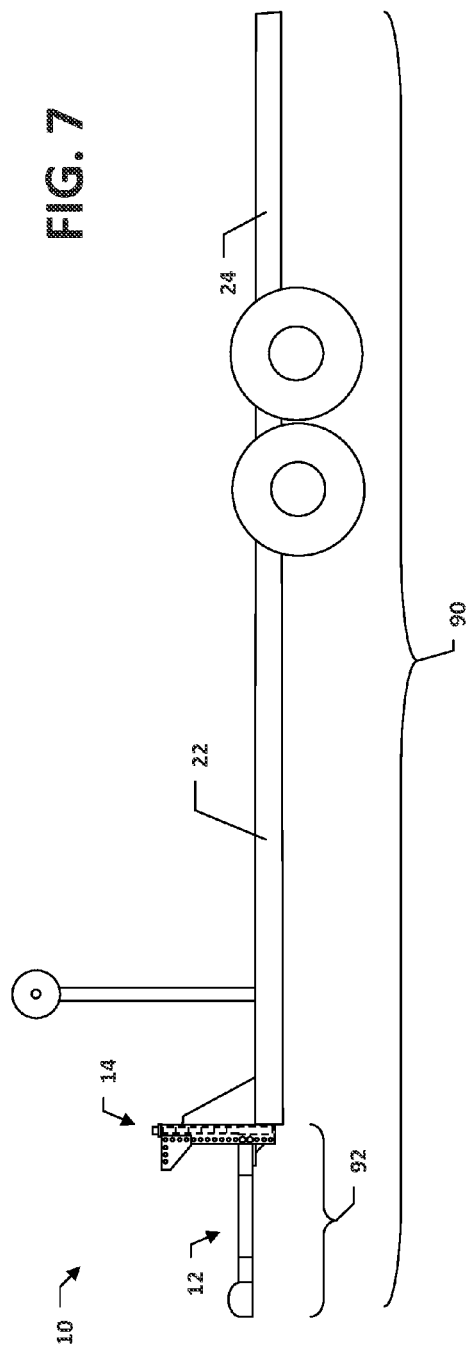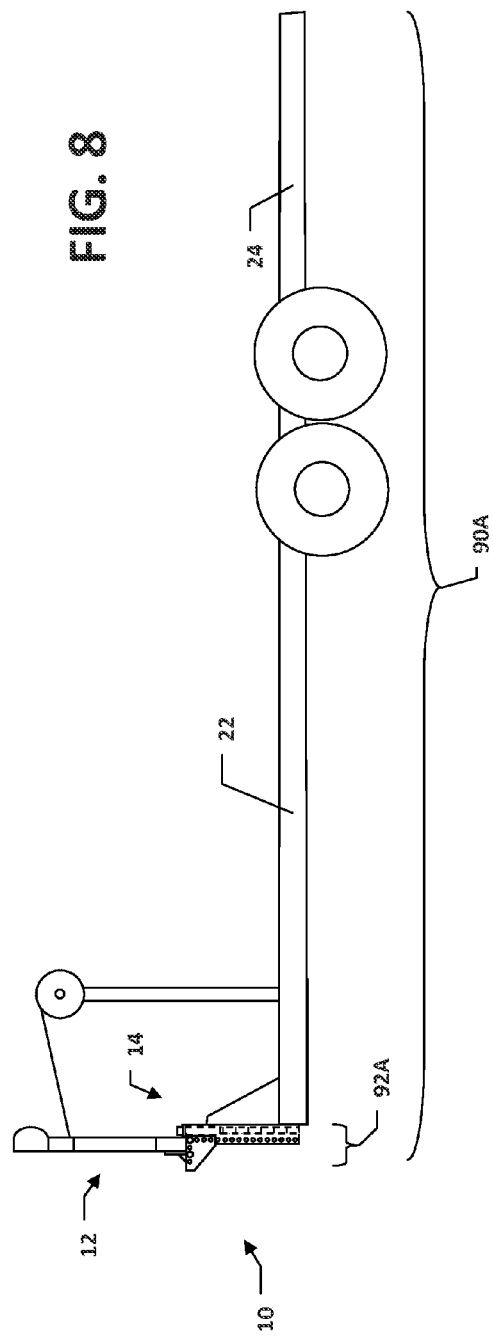

ADJUSTABLE TRAILER TONGUE

CROSS-REFERENCE TO RELATED APPLICATION

This application claims the benefit of U.S. Provisional Application Ser. No. 61/484,938, filed on May 11, 2011, the contents of which are herein incorporated by reference in their entirety.

FIELD OF THE INVENTION

The present invention relates to trailers, and more particularly, to trailer tongues and related methods of use and assembly.

BACKGROUND OF THE INVENTION

Many vehicles incorporate trailer hitches on rear ends thereof. Trailer tongues can be mounted on these hitches, allowing the vehicles to tow associated trailers. However, there can be significant differences in the hitch heights of different vehicles. Various mechanisms, both for the vehicles and for the trailers, have been proposed to accommodate these differences in height. Nonetheless, further improvements are possible.

SUMMARY OF THE INVENTION

In view of the foregoing, it is an object of the present invention to provide an improved trailer tongue assembly in which the tongue is adjustable to accommodate varying vehicle hitch heights. It is another object of the present invention to provide a trailer tongue assembly in which the tongue is pivotable into a vertical position to reduce the effective length of the associated trailer when the use of the tongue is not required.

According to an embodiment of the present invention, a trailer tongue assembly includes a trailer tongue having trailer tongue front and rear portions, the trailer tongue front portion being configured for releasable attachment to a trailer hitch, and an attachment frame connected to the trailer tongue rear portion and configured for attachment to a trailer. The trailer tongue front portion is independently translatable and rotatable in a vertical plane relative to the attachment frame.

According to a method aspect, a method of using a trailer tongue assembly includes translating a trailer tongue front portion in a vertical plane relative to an attachment frame to adjust an effective height of a trailer tongue, and rotating the trailer tongue in the vertical plane relative to the attachment frame to reduce an effective length of the trailer tongue.

These and other objects, aspects and advantages of the present invention will be better appreciated in view of the drawings and following detailed description of a preferred embodiment.

BRIEF DESCRIPTION OF THE DRAWINGS

FIG. 3 is a side view of the adjustable trailer tongue assembly of FIG. 1, at a first height in an extended position;

FIG. 4 is a side view of the adjustable trailer tongue assembly of FIG. 1, translating to a second height;

FIG. 5 is a side view of the adjustable trailer tongue assembly of FIG. 1, at the second height rotating to a retracted position;

FIG. 6 is a side view of the adjustable trailer tongue assembly of FIG. 1, at the second height in the retracted position;

FIG. 7 is a side view of a trailer with the adjustable trailer tongue assembly of FIG. 1 in the position of FIG. 3; and FIG. 8 is a side view of a trailer with the adjustable trailer tongue assembly of FIG. 1 in the position of FIG. 6.

DETAILED DESCRIPTION OF A PREFERRED EMBODIMENT

Figure 1:
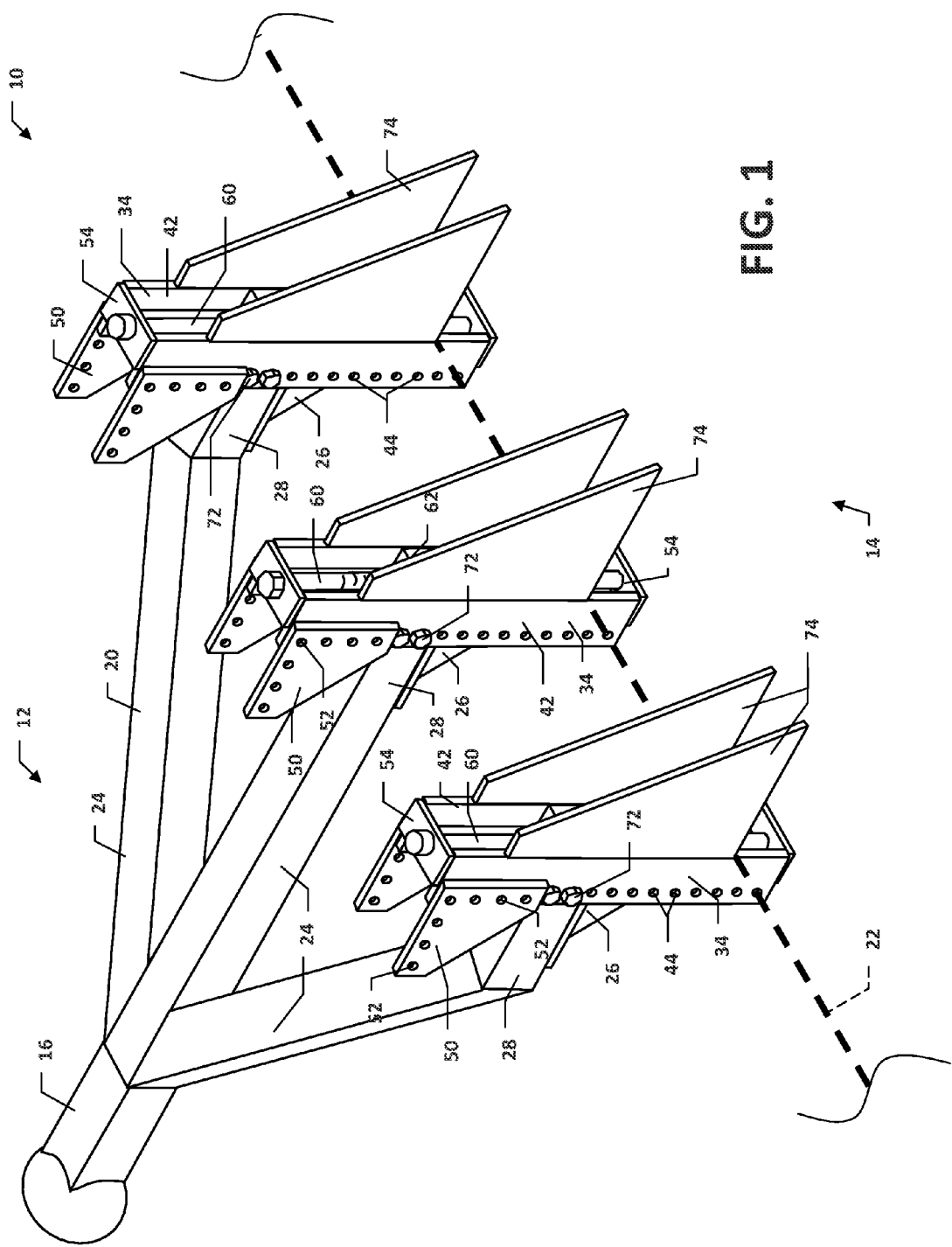
FIG. 1 is a perspective view of an adjustable trailer tongue assembly mounted on the front end of a trailer, according to an embodiment of the present invention.
Figure 2:
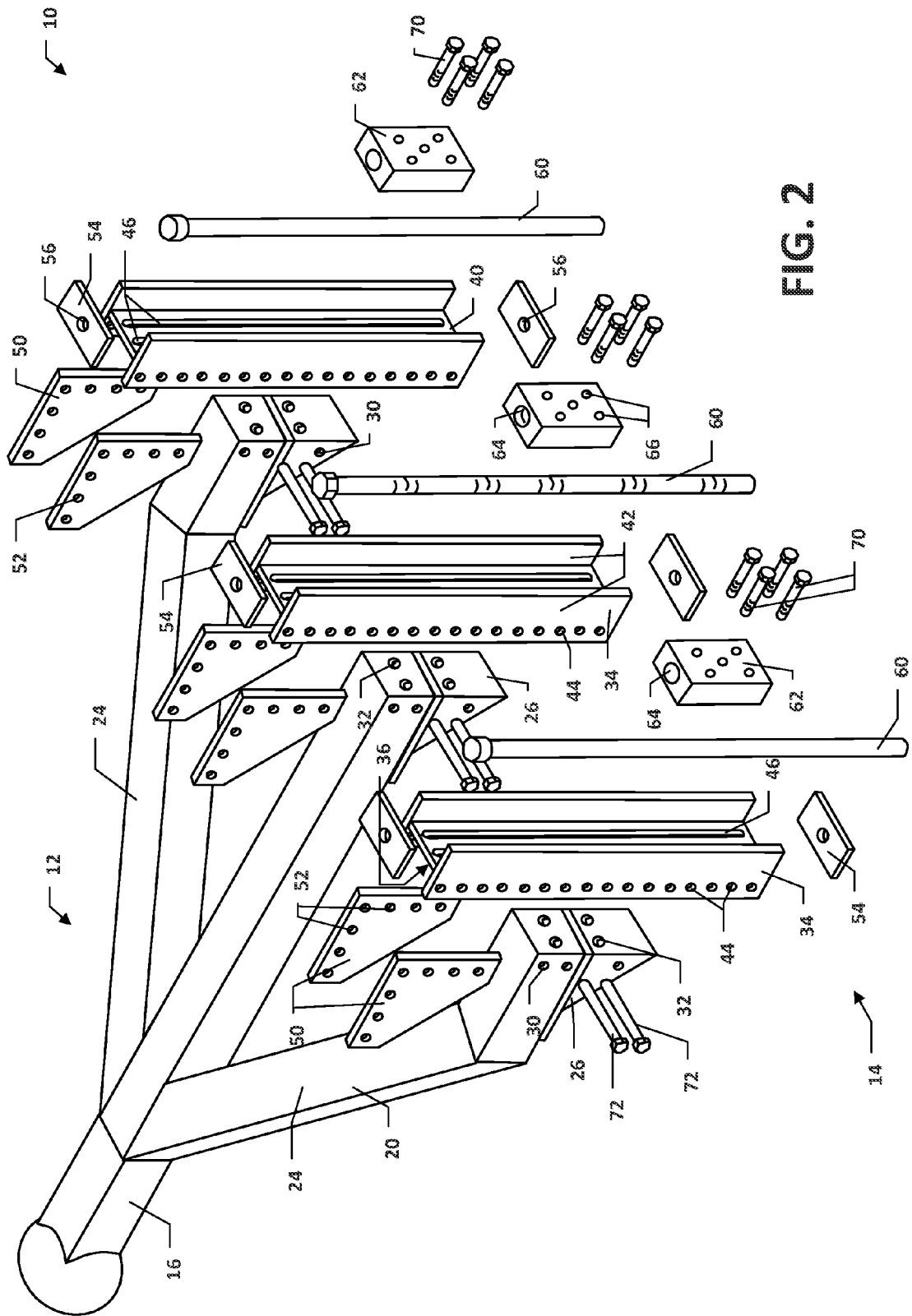
FIG. 2 is a partial exploded view of the adjustable trailer tongue assembly of FIG. 1.

Referring to FIGS. 1 and 2, according to an embodiment of the present invention, a trailer tongue assembly 10 includes a tongue 12 and an attachment frame 14. The tongue 12 has a front portion 16 configured for releasable attachment to a trailer hitch and a rear portion 20 that connects to the attachment frame 14. The attachment frame 14 attaches to a front end of a trailer, indicated generically at 22. As will be described in greater detail below, the trailer tongue front portion 16 is translatable in a vertical plane relative to the attachment frame 14, and also rotatable in the same plane. In the depicted embodiment, the trailer tongue front portion 16 is configured to receive a ball hitch. The trailer tongue assembly 10 could readily be modified to accept virtually any hitch without departing from the scope of the present invention.

The trailer tongue 12 is an "A" frame tongue, such that the rear portion 20 has a plurality of tongue arms 24; for instance, three arms 24. The arms 24 join at the front portion 16 and spread horizontally as they move rearwardly therefrom, forming a plurality of discrete connection points with the attachment frame 14. Lower extensions 26 extend below the rear ends of each of the arms 24, with placement holes 30 being defined extending horizontally between opposite sides thereof and connecting holes 32 being defined extending horizontally into the arms 24 from the ends. Preferably, an end section 28 of each arm 24, above the lower extensions 26, extends straight back parallel with the other end sections 28.

The attachment frame 14 includes a vertical beam 34 at each connection point with one of the tongue arms 24. The vertical beams 34 each have a front side 36 facing the trailer tongue rear portion 20 and rear side 40 facing away therefrom. The vertical beams 34 each have a pair of sidewalls 42 that extend forwardly and have a plurality of placement holes 44 defined therethrough. Advantageously, the sidewalls 42 extend forwardly and rearwardly, such that each beam 34 is an H-beam. Vertically elongated slots 46 are defined extending between the front and rear sides 36, 40 of the each vertical beam 34. Two slots 46 are shown in each beam 34, although more or less could be employed.

Upper end brackets 50 are connected to opposite sidewalls 42 of each vertical beam 34 and extend forwardly therefrom. A plurality of placement holes 52 are defined therein, a portion of which align with underlying placement holes 44 in the vertical beam 34 and a portion of which extend in a line forwardly therefrom.

Guide rod end plates 54 are connected to the top and bottom of each vertical beam 34 over the rearwardly extending portions of the sidewalls 42. Guide rod openings 56 are defined therein. Supported and positioned by the end plates 54, a guide rod 60 extends vertically behind the rear side 40 each vertical beam 34. Preferably, a central one the guide rods 60 is threaded.

A guide block 62 rides on each guide rod 60. A vertically extending guide hole 64 is defined therethrough to accommodate the corresponding guide rod 60, as well as plurality of horizontally extending connection holes 66. A central one of the guide blocks 62 has a threaded guide hole 64 to engage the corresponding threaded guide rod 60.

End bolts 70 extending through the connection holes 66 attach the tongue arms 24 of the tongue rear portion 20 to the guide blocks 62, and hold the tongue 12 to the attachment frame 14 while allowing translational movement therebetween. To releasably secure the tongue 12 at a desired vertical height, cross pins 72 are inserted into the placement holes 30 through the placement holes 44 in the sidewalls 42. At higher heights, the cross pins 72 are also inserted through the placement holes 52 in the upper end brackets. A cotter pin or the like can be used to help retain cross pins 72 in place.

Mounting brackets 74 extend rearwardly from the vertical beams 34 and assist in the secure mounting of the attachment frame 14 to the forward end of the trailer 22. The mounting brackets 74 can, for example, be welded to rear edges of the sidewalls 42 and to the trader 22, although other connection arrangements for the attachment frame 14 are possible within the scope of the invention.

The operation of the adjustable trader tongue assembly 10 will be described with reference to FIGS. 3-6. Referring to FIG. 3, the tongue 12 is at a first height, connected to the attachment frame 14 via the guide block(s) 62 (in broken lines) and end bolts 70 (see FIG. 2) and secured at the first height by cross pins 72. For illustrative purposes, the first height represents a lowest height of the tongue 12 and its forward portion 16. It will be appreciated that the vertical range of motion of the forward portion 16 can be extended or diminished, as desired.

Referring to FIG. 4, to translate the tongue front portion 16 (and, as depicted, the entire tongue 12) in the vertical plane (represented by 80), the cross pins 72 are removed and the threaded guide rod 60 (in broken lines) is turned via handle 82 to effect vertical movement of the corresponding guide block 62 and translation of the tongue 12 up or down. The turning of the threaded guide rod 60 could also be accomplished via a motor. Additionally, the side guide rods 60 could be threaded, and mechanically linked to the central guide rod 60 to turn in unison therewith. Other mechanisms, including hydraulics, could also used to raise and lower the tongue 12. When a desired height is reached, the cross pins 72 can be reinserted.

Referring to FIG. 5, the tongue 12 can also be rotated in the vertical plane 80, independently of translational movement. For maximum rotation, the tongue 12 is raised to its highest height and only one cross pin 72 is inserted through an uppermost placement hole 44, 52 at each connection point. The end bolts 70 (see FIG. 2) are removed to disconnect the tongue 12 from the guide block(s) 62 from the tongue 12. The tongue 12 can now be rotated by pivoting the rear portion 20 about the uppermost cross pin(s) 72. Referring to FIG. 6, once the tongue 12 is rotated into a vertical position, it is secured by inserting a second cross pin(s) through the tongue end portion 20 via placement hole(s) 52 in the upper end bracket(s) 50.

To facilitate rotation of the tongue 12, a winch 84 is connected to the tongue via a cable 86. The winch 84 can be a manual winch; for instance, a hand crank winch. Alternately, the tongue 12 can be manually rotated or a motorized winch could be employed Advantageously, the winch can be located on one arm of an "A" frame with a a pulley on the other arm of the "A" frame at a tie off point. The cable can be routed through another pulley at the attachment point on the tongue. In general, to allow proper pull of the tongue to the vertical position the pulley on the "A" frame should be at least as high as the pulley point on the tongue when in the vertical position.

Referring to FIGS. 7 and 8, it will be appreciated that the adjustable trailer tongue assembly 10 of the present invention is not only capable of accommodating a wide range of trailer hitch heights, but also of allowing a significant decrease in the effective length 90 of the trailer 22 to which the assembly 10 is attached. By rotating the tongue 12 into from an extended position (FIG. 7) into a vertically retracted position (FIG. 8), the effective length 92 of the tongue assembly 10 is greatly reduced to an effective length 92A. Accordingly, the effective length of the entire trailer 22 is reduced by the same amount from length 92 to length 92A. This reduction in length allows for a longer trailer to be employed where effective length is a limitation. For example, if the trailer must be shipped in a container or other constrained volume, a longer trailer bed 24 can be used than if the shipped effective length included the full length of the tongue.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A trailer tongue assembly comprising:
a trailer tongue having trailer tongue front and rear portions, the trailer tongue front portion being configured for releasable attachment to a trailer hitch; and
an attachment frame connected to the trailer tongue rear portion and configured for attachment to a trailer;
wherein the trailer tongue front portion is translatable in a vertical plane relative to the attachment frame; and
wherein the trailer tongue is an "A" frame tongue, the trailer tongue rear portion including a plurality of tongue arms extending rearwardly from the trailer tongue front portion, each of the plurality of tongue arms being connected to the attachment frame.

2. The trailer tongue assembly of claim 1, wherein the trailer tongue front end is also rotatable in the vertical plane relative to the attachment frame.

3. The trailer tongue assembly of claim 1, wherein the entire trailer tongue is translatable in the vertical plane relative to the attachment frame.

4. The trailer tongue assembly of claim 3, wherein the attachment frame includes at least one vertical beam and having beam front and rear sides and defining at least one vertically elongated slot therein extending between the front and rear sides, the trailer tongue rear portion being slidably connected to the beam front side by at least one end bolt extending through the slot.

5. The trailer tongue assembly of claim 4, wherein the at least one vertical beam includes at least one forwardly extending sidewall having a plurality of vertical placement holes, a plurality of translated positions of the trailer tongue in the vertical plane relative to the attachment frame being releasably fixable by insertion of a cross-pin into the trailer tongue rear portion through corresponding ones of the plurality of vertical placement holes.

6. The trailer tongue assembly of claim 5, wherein the trailer tongue is also rotatable in the vertical plane relative to the attachment frame by removing the at least one end bolt and pivoting the trailer tongue about the cross-pin.

7. A trailer tongue assembly comprising:
a trailer tongue having trailer tongue front and rear portions, the trailer tongue front portion being configured for releasable attachment to a trailer hitch; and
an attachment frame connected to the trailer tongue rear portion and configured for attachment to a trailer;

wherein the trailer tongue front portion is translatable in a vertical plane relative to the attachment frame;

wherein the entire trailer tongue is translatable in the vertical plane relative to the attachment frame;

wherein the attachment frame includes at least one vertical beam and having beam front and rear sides and defining at least one vertically elongated slot therein extending between the front and rear sides, the trailer tongue rear portion being slidably connected to the beam front side by at least one end bolt extending through the slot; and wherein the attachment frame includes:

at least one guide block attached to the trailer tongue rear portion by the at least one end bolt and defining a guide hole extending vertically therethrough; and at least one vertically extending guide rod adjacent to the at least one vertical beam and extending through the guide hole such that the at least one guide block rides on the at least one guide rod during translation of the trailer tongue in the vertical plane.

8. The trailer tongue assembly of claim 7, wherein the at least one guide block and the at least one guide rod are located behind the beam rear side.

9. The trailer tongue assembly of claim 7, wherein the at least one guide rod and the guide hole have complementary threaded portions, the at least one guide rod being rotatably mounted and rotation thereof effecting the translation of the trailer tongue in the vertical plane relative to the attachment frame through translation of the at least one guide block.

10. The trailer tongue assembly of claim 7, wherein the trailer tongue is an "A" frame tongue, the trailer tongue rear portion including a plurality of tongue arms extending rearwardly from the trailer tongue front portion, each of the plurality of tongue arms being connected to the attachment frame, the at least one vertical beam, the at least one guide rod and at least one guide block of the frame assembly including a guide rod and a guide block for each of the of the tongue arms.

11. The trailer tongue assembly of claim 10, wherein one of the guide rods and one of the guide holes have complementary threaded portions, the threaded one of the guide rods being rotatably mounted and rotation thereof effecting the translation of the trailer tongue in the vertical plane relative to the attachment frame through translation of the threaded one of the guide blocks.

12. The trailer tongue assembly of claim 11, wherein the plurality of tongue arms includes three tongue arms and the one of the guide rods and the one of the guide holes with complementary threaded portions are connected with a central one of the three tongue arms.

13. A trailer comprising:

a trailer bed having trailer bed front and rear ends;

at least one pair of wheels supporting the trailer bed; and a trailer tongue assembly including:

a trailer tongue having trailer tongue front and rear portions, the trailer tongue front portion being configured for releasable attachment to a trailer hitch; and an attachment frame connected to the trailer tongue rear portion and to the trailer bed front end;

wherein the trailer tongue front portion is translatable in a vertical plane relative to the attachment frame and the trailer bed; and wherein the trailer tongue is an "A" frame tongue, the trailer tongue rear portion including a plurality of tongue arms extending rearwardly from the trailer tongue front portion, each of the plurality of tongue arms being connected to the attachment frame.

14. A method of using a trailer tongue assembly, the method comprising:

translating a trailer tongue front portion in a vertical plane relative to an attachment frame to adjust an effective height of a trailer tongue;

wherein translating the trailer tongue front portion includes sliding a trailer tongue rear portion vertically adjacent to at least one vertical beam of the attachment frame; and wherein sliding the trailer tongue rear portion includes sliding a guide block connected to the trailer tongue rear portion with an operator.

15. The method of claim 14, wherein the operator is a guide rod in threaded engagement with the guide block and sliding the guide block includes rotating the guide rod.

16. The method of claim 14, further comprising rotating the trailer tongue in the vertical plane relative to the attachment frame to reduce an effective length of the trailer tongue.

17. The method of claim 16, wherein rotating the trailer tongue includes disconnecting the trailer tongue rear portion from the guide block.

* * * * *